July 25, 1933.  J. J. QUINN  1,919,744
COVER FOR AUTOMOBILE RUMBLE SEATS
Filed Oct. 27, 1931  2 Sheets-Sheet 1
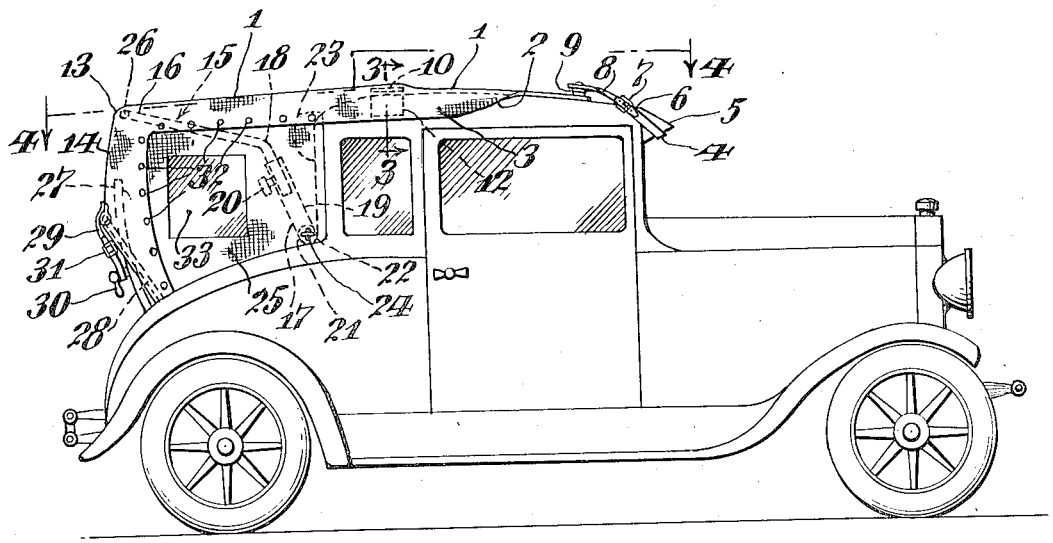
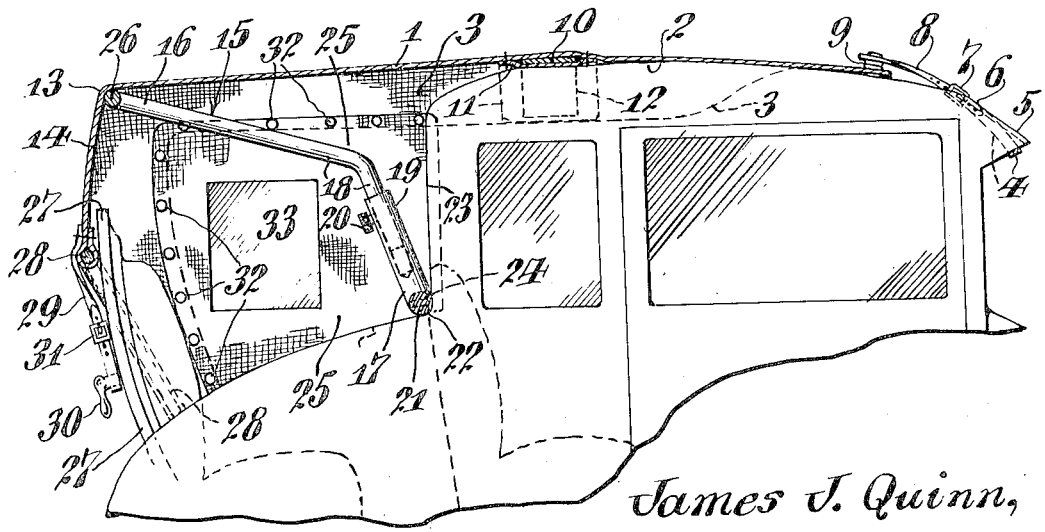
James J. Quinn,
INVENTOR
BY Victor J. Evans
ATTORNEY July 25, 1933. J. J. QUINN 1,919,744
COVER FOR AUTOMOBILE RUMBLE SEATS
Filed Oct. 27, 1931 2 Sheets-Sheet 2
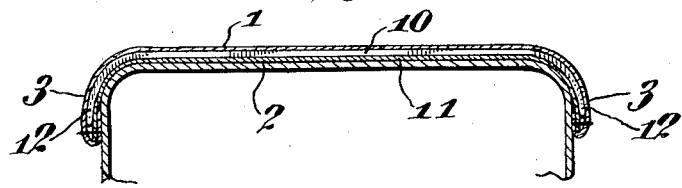
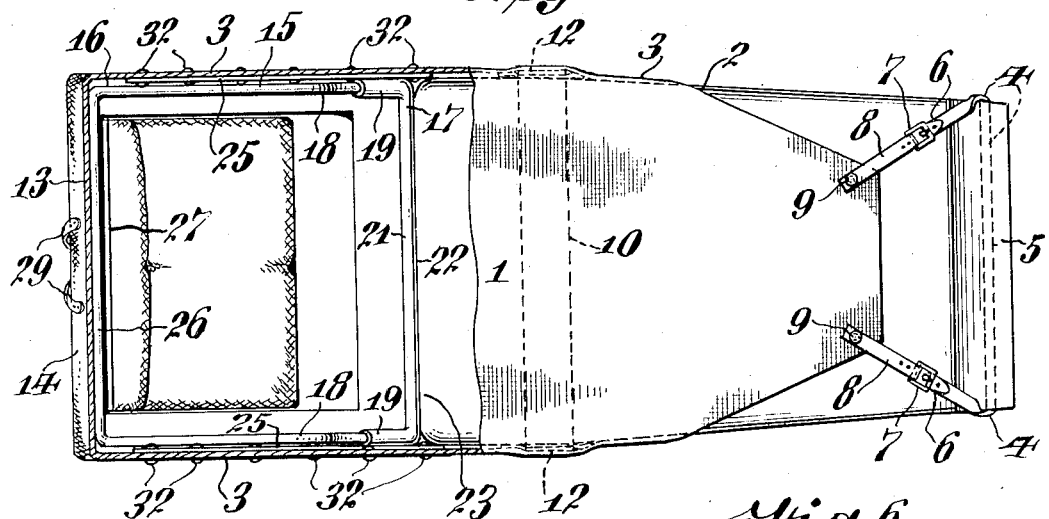
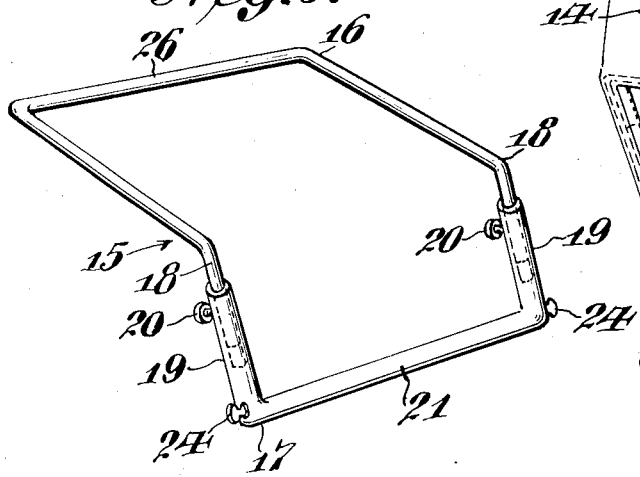
James J. Quinn,
INVENTOR
BY Victor J. Evans
ATTORNEY Patented July 25, 1933

1,919,744

UNITED STATES PATENT OFFICE

JAMES J. QUINN, OF PHILADELPHIA, PENNSYLVANIA

COVER FOR AUTOMOBILE RUMBLE SEATS

Application filed October 27, 1931. Serial No. 571,395.

The present invention relates to an improved cover for automobile rumble seats, more especially the coupe type, and the primary purpose of the invention is to provide a cover which is easily attached, removable and foldable into a small compass, capable of storage in the back of the vehicle.

Another purpose is to provide a cover, so attached in the front under the visor and extended toward the rear and supported and attached at the back of the housing of the automobile, and to the back of the rumble seat, and so constructed as to permit side curtains to be easily hung.

Another purpose is to provide an improved support for the cover engageable on the rear of the body immediately at the back of the enclosure of the vehicle, so arranged and constructed as to extend toward the rear and terminate at a point above and back of the rumble seat, thereby affording a support for the cover; viz. a support in a line with the plane of the top of the enclosure.

A further purpose is to provide a reinforcing for the rear downward portion of the cover, so constructed as to arch the back of the rumble seat, including means for attaching the cover to the handle, which is used for opening the rumble seat back, so as to hold the cover substantially taut when in position.

A still further purpose is to provide a clamp mounted transversely of the cover and adapted to arch the upper portion of the enclosure of the automobile, to further insure neatness in appearance when the cover is applied.

It is to be understood that the particulars herein given are in no way limitive, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 1 is a view in side elevation of a portion of a coupe type of automobile, showing the cover as applied, for use in connection with a rumble seat.

Figure 2 is an enlarged longitudinal sectional view.

Figure 3 is a transverse sectional view on line 3—3 of Figure 1.

Figure 4 is a sectional view on line 4—4 of Figure 1.

Figure 5 is an enlarged detail view of the support for the cover, which support engages at the rear of the enclosure of the automobile and extends back over and spaced above the back of the rumble seat.

Figure 6 is an enlarged detail view of the rear lower portion of the cover, showing the reinforcing therefor.

Referring to the drawings 1 identifies the body of the cover, which may be made of any suitable pliable material, such as waterproof canvas, duck, oilcloth, or material simulating the tops of automobiles.

The forward portion of the cover engages the usual top of the enclosure of a coupe as shown at 2, and it has downward extending side flanges 3. The forward part of the cover tapers toward the front, and a suitable strap 4 engages under the visor 5, and has its end portions 6 connected by means of buckles 7 to extension straps 8. These extension straps are fastened by suitable snap fasteners 9 to the forward tapered extremity of the body 1 of the cover.

Where the cover fits on the top of the enclosure of the automobile, a clamp strip 10 is fastened to the cover by an overlying piece 11. The fastening of the piece 11 to the under face of the cover causes the pocketing of the clamping strip. The strip has down-turned ends 12, which necessarily conform to the flanges 3 of the cover, thereby assisting in holding the cover on the top of the enclosure of the automobile.

The cover extends rearwardly, and at a point identified at 13 the cover extends downwardly as shown at 14. To hold the cover in this position, and at the same time stretch it in order to give a neat appearance, a suitable support 15 is supplied. This support comprises two U-shaped sections 16 and 17, the arms 18 of the former telescope the arms 19 of the latter, there being suitably set screws or similar devices 20 for holding the two sections in different adjusted positions. The transverse part 21 of the section 17 engages in the crotch 22 caused to be formed where the enclosure 23 of the automobile rises from the top of the vehicle, there being loops 24 on the ends of the U-shaped section 17, for the purpose of fastening down the side curtains 25, which will be hereinafter described. The section 16 of the support has a transverse part 26, which engages with the cover, where it turns down over the back 27 of the rumble seat; in fact, at the point 13, and when the portion 14 of the cover is drawn taut and fastened as will be hereinafter specified, the support 15 is held with ample rigidity in the position illustrated, the top of the cover being taut from the forward portion to the rear portion.

Fitted in a fold of the lower part of the portion 14 of the cover is a U-shaped reinforcing piece 28, the side arms of which straddle the back 27 (which really constitutes a closure for the rumble seat compartment at the rear of the body of the vehicle) of the rumble seat. Where this reinforcing is applied to the cover, the cover has a suitable strap 29, which is connected or looped around the handle 30 of the rumble seat back, there being a suitable buckle 31 to draw the strap taut, in order to tighten the entire cover in position. In this manner the entire cover is drawn taut from the front to the rear, and by this arrangement the support 15 is held in position.

As previously stated, the cover has flanges 3, which extend from a point near the front to the rear and down the sides of the part 14 of the cover, and arranged at intervals along these flanges are conventional snap fasteners 32, by which the side curtains 25 are connected to the flanges so as to entirely enclose the rear part of the vehicle incident to the rumble seat. It is true that the side curtains may or may not be provided with transparent covered side openings 33.

The invention having been set forth, what is claimed is:

The combination with an automobile body having an occupant receiving enclosure substantially midway its ends and provided at the rear of the enclosure with a rumble seat compartment having a rumble seat back, of a cover comprising a cover body engaged with and straddled fittingly with the top of said enclosure and provided with a U shaped element incased in the cover to retain the cover in the straddled position of the top of the enclosure, the forward end of the cover having a strap connected thereto and fitting under the visor of the forward part of the enclosure to draw the cover tight, said cover extending rearwardly from the top of the enclosure and downwardly and substantially overlying the rear face of the rumble seat back, said downwardly extending rear portion of the cover having a single piece U shaped reinforcing element straddling the rumble seat back, said edge portion of the rear downwardly extending part of the cover having a pair of straps to engage the handle of the rumble seat back for drawing the cover taut, and a support engaged with the crotch where the rear part of the enclosure rises from the body of the automobile just forward of the rumble seat compartment, said support comprising a rectangular frame with angular side arms, portions of the side arms extending forwardly and slightly rearwardly and certain other portions of the side arms extending substantially directly rearwardly and merging into a transverse piece to engage under and with the cover when the latter is stretched to retain the support rigidly in position, said support comprising U shaped sections including telescopically connected parts which constitute the side arms.

JAMES J. QUINN.